(12) United States Patent
Hanyu (10) Patent No.: US 7,505,228 B2
(45) Date of Patent: Mar. 17, 2009

(54) HEAD SLIDER HAVING A LEADING PAD INLET EDGE WITH INLET RECESSES, HEAD SUSPENSION ASSEMBLY, AND DISK DEVICE PROVIDED WITH THE SAME

(75) Inventor: Mitsunobu Hanyu, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 382 days.

(21) Appl. No.: 11/401,271

(22) Filed: Apr. 11, 2006

(65) Prior Publication Data

US 2006/0238922 A1   Oct. 26, 2006

(30) Foreign Application Priority Data

Apr. 22, 2005   (JP) .............................. 2005-125494

(51) Int. Cl.
*G11B 5/60* (2006.01)
(52) U.S. Cl. .................................. 360/235.6; 360/235.8
(58) Field of Classification Search ............... 360/235.6, 360/235.8, 236.3, 236.4
See application file for complete search history.

(56) References Cited

U.S. PATENT DOCUMENTS

| | | | |
|---|---|---|---|
| 5,404,256 A | 4/1995 | White | |
| 5,777,825 A | 7/1998 | Dorius | |
| 5,872,686 A | 2/1999 | Dorius et al. | |
| 6,683,755 B2 | 1/2004 | Koishi | |
| 6,950,281 B2 | 9/2005 | Kameyama | |
| 6,961,217 B2 * | 11/2005 | Kameyama et al. | 360/235.6 |
| 7,099,114 B2 * | 8/2006 | Kang | 360/235.6 |
| 7,352,531 B2 * | 4/2008 | Kameyama | 360/235.6 |
| 2001/0053046 A1 * | 12/2001 | Koishi | 360/236.2 |
| 2002/0001157 A1 | 1/2002 | Kang et al. | |
| 2002/0145828 A1 * | 10/2002 | Mundt et al. | 360/235.6 |
| 2003/0165031 A1 * | 9/2003 | Rajakumar | 360/235.6 |
| 2004/0012887 A1 * | 1/2004 | Rajakumar et al. | 360/236.2 |
| 2004/0027724 A1 | 2/2004 | Pendray et al. | |
| 2005/0213253 A1 | 9/2005 | Takahashi et al. | |

(Continued)

FOREIGN PATENT DOCUMENTS

CN   1716389   1/2006

(Continued)

OTHER PUBLICATIONS

Australian Search Report dated Jan. 18, 2007 for Singapore Appln. No. 200602088-7.

*Primary Examiner*—Jefferson Evans
(74) *Attorney, Agent, or Firm*—Pillsbury Winthrop Shaw Pittman, LLP (57) ABSTRACT

A slider of a head has a negative-pressure cavity which is formed in the facing surface and generates a negative pressure, a leading step portion which protrudes from the facing surface and is situated on an upstream side of the air current with respect to the negative-pressure cavity, and a leading pad which is provided on the leading step portion and faces the recording medium. The leading pad has an inlet end edge which is situated on the upstream side of the air current and extends throughout a length of the leading step portion in the transverse direction, and a plurality of recesses which individually open in the inlet end edge and extend in the longitudinal direction from the inlet end edge.

11 Claims, 9 Drawing Sheets

U.S. PATENT DOCUMENTS

2005/0280943 A1 * 12/2005 Inoue et al. ............. 360/236.2
2006/0082927 A1    4/2006 Hanyu

FOREIGN PATENT DOCUMENTS

| | | |
|---|---|---|
| EP | 0 747 890 A1 | 12/1996 |
| JP | 09-330510 | 12/1997 |
| JP | 10-125025 | 5/1998 |
| JP | 2000-057724 | 2/2000 |
| JP | 3120504 B2 | 12/2000 |
| JP | 2001-312811 | 11/2001 |

* cited by examiner

Example A
FIG. 6A

Example B
FIG. 6B

Comparative example
FIG. 6C

Pico-slider

FIG. 14A

Pemto-slider

HEAD SLIDER HAVING A LEADING PAD INLET EDGE WITH INLET RECESSES, HEAD SUSPENSION ASSEMBLY, AND DISK DEVICE PROVIDED WITH THE SAME

CROSS-REFERENCE TO RELATED APPLICATIONS

This application is based upon and claims the benefit of priority from Japanese Patent Application No. 2005-125494, filed Apr. 22, 2005, the entire contents of which are incorporated herein by reference.

BACKGROUND

1. Field

One embodiment of the invention relates to a head used in a disk device such as a magnetic disk device, a head suspension assembly provided with the head, and a disk device provided with the head suspension assembly.

2. Description of the Related Art

A disk device, e.g., a magnetic disk device, comprises a magnetic disk in a case, a spindle motor that supports and rotates the disk, a magnetic head that writes and reads information to and from the disk, and a carriage assembly that supports the head for movement with respect to the disk. The carriage assembly comprises a rockably supported arm and a suspension extending from the arm. The magnetic head is supported on an extended end of the suspension. It has a slider mounted on the suspension and a head portion on the slider. The head portion includes a reproducing element for reading and a recording element for writing.

The slider has a facing surface that faces a recording surface of the magnetic disk. The facing surface of the slider is formed having a negative-pressure chamber as a negative-pressure generating section for generating a negative pressure. The suspension applies to the slider a given head load that is directed toward a magnetic recording layer of the magnetic disk. As the magnetic disk device is operated, an air current is produced between the rotating magnetic disk and the slider. Thereupon, the facing surface of the slider is subjected to a positive pressure that is opposite to the negative pressure generated by the negative-pressure chamber, that is, a force to fly the slider above the recording surface of the disk. The slider is flown with a fixed gap kept above the disk recording surface by balancing the flying force and the head load.

The flying height of the slider is expected to be substantially the same in any radial position on the magnetic disk. The rotational frequency of the magnetic disk is constant, while its peripheral speed varies depending on the radial position. Since the magnetic head is positioned by the rotary carriage assembly, moreover, the yaw angle (angle between the direction (track direction) of the current and the center line of the slider) also varies depending on the radial position on the disk. In designing the slider, therefore, change of the flying height attributable to the radial position on the disk must be restrained by suitably utilizing the aforesaid two parameters that vary depending on the radial position.

With the recent improvement in the recording density, miniaturization of sliders has been promoted, and so-called pico-sliders, femto-sliders, etc. have been investigated. If a slider is miniaturized so that its transverse dimension is reduced, the roll or swing of the slider around its longitudinal axis is caused easily. The roll angle of the slider changes depending on the radial position on the disk. If the roll angle of the slider varies, the recording/reproducing characteristics fluctuate.

In order to prevent the variation of the roll angle, a novel magnetic head slider is proposed in Jpn. Pat. Appln. KOKAI Publication No. 9-330510, for example. In this head slider, a negative-pressure generating section of a slider is divided into a plurality of parts to disperse the inclination of a negative-pressure distribution, so that the slider can be restrained from rolling even if the yaw angle is increased.

If the negative-pressure generating section is thus divided for dispersion, however, the flexibility of its design lowers and its area is reduced, so that there is a possibility of the resulting negative pressure lowering. In this case, it is hard to maintain a stable flying posture of the slider, so that the reliability of the recording/reproducing characteristics may possibly be spoiled.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a head comprises: a slider which has a facing surface opposed to a surface of a rotatable recording medium and is flown by an air current produced between the recording medium surface and the facing surface as the recording medium rotates; and a head portion which is provided on the slider and records and reproduces information to and from the recording medium, the facing surface of the slider having a longitudinal direction extending in the direction of the air current and a transverse direction perpendicular to the longitudinal direction, the slider having a negative-pressure cavity which is formed in the facing surface and generates a negative pressure, a leading step portion which protrudes from the facing surface and is situated on an upstream side of the air current with respect to the negative-pressure cavity, and a leading pad which is provided on the leading step portion and faces the recording medium, the leading pad having an inlet end edge which is situated on the upstream side of the air current and extends throughout a length of the leading step portion in the transverse direction and a plurality of recesses which individually open in the inlet end edge and extend in the longitudinal direction from the inlet end edge.

Figure 1:
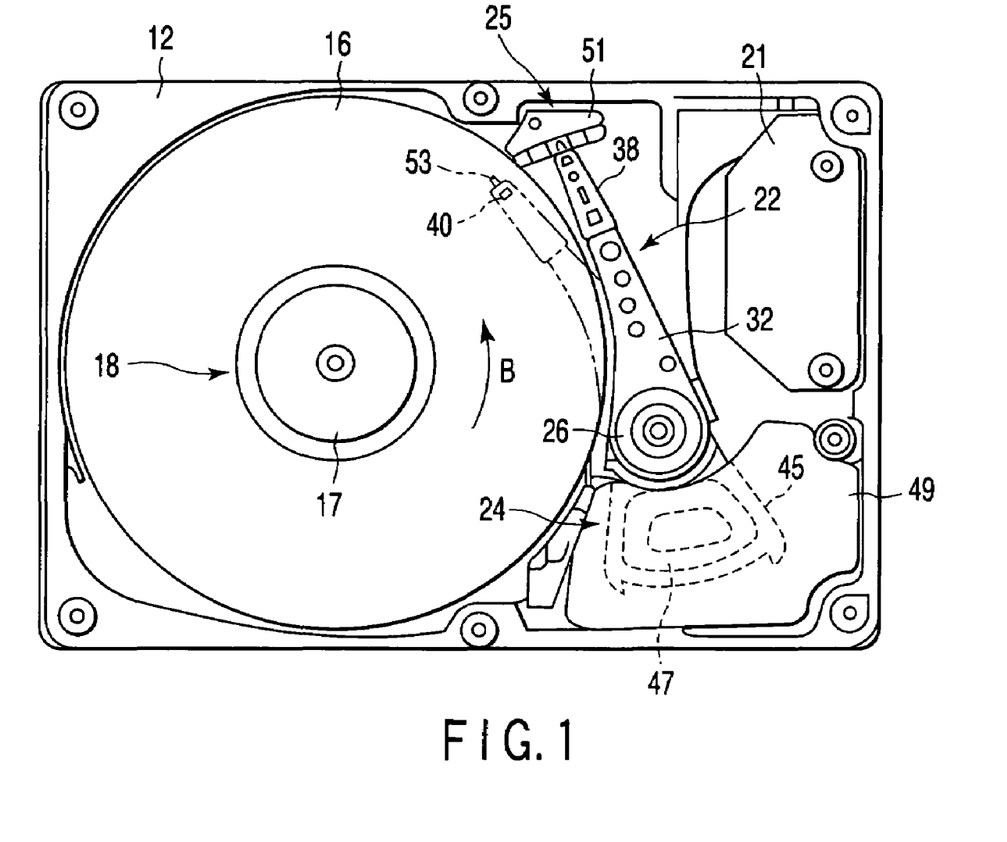
FIG. 1 is a plan view showing a hard disk drive (hereinafter, referred to as an HDD) according to an embodiment of the invention.
Figure 2:
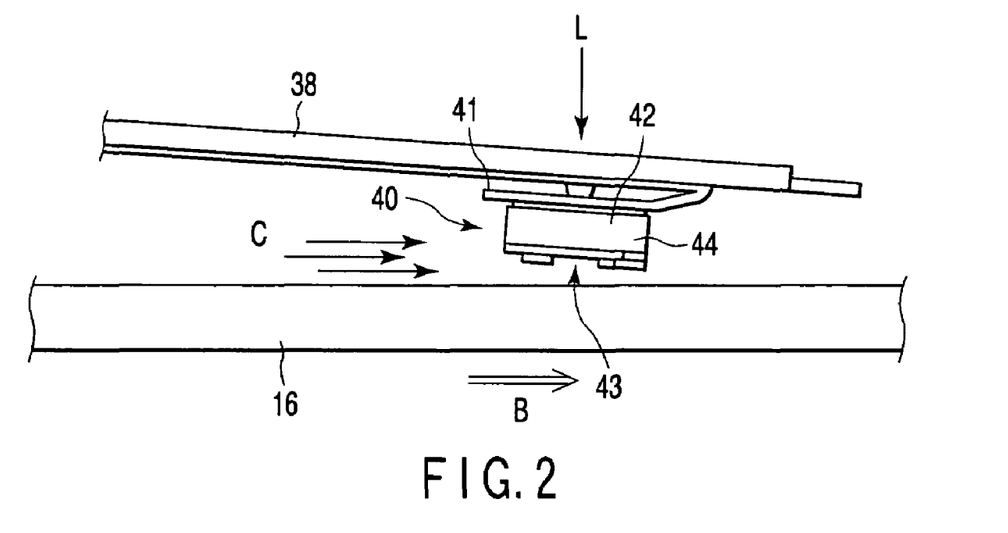
FIG. 2 is an enlarged side view showing a portion including a magnetic head of the HDD.

An embodiment in which a disk device according to this invention is applied to an HDD will now be described in detail with reference to the accompanying drawings FIG. 1 is a plan view showing the internal structure of the HDD with its top cover off. FIG. 2 shows a magnetic head in a flying state. As shown in FIG. 1, the HDD comprises a case 12 in the form of an open-topped rectangular box and a top cover (not shown), which is screwed to the case with screws and closes a top opening of the case.

The case 12 contains a magnetic disk 16 for use as a recording medium, a spindle motor 18, magnetic heads, and a carriage assembly 22. The spindle motor 18 serves as a drive section that supports and rotates the disk. The magnetic heads are used to write and read information to and from the disk. The carriage assembly 22 supports the magnetic heads for movement with respect to the magnetic disk 16. The case 12 further contains a voice coil motor (VCM) 24, a ramp load mechanism 25, a board unit 21, etc. The VCM 24 rocks and positions the carriage assembly. The ramp load mechanism 25 holds the magnetic heads in a retreated position off the magnetic disk when the heads are moved to the outermost periphery of the disk. The board unit 21 has a head IC and the like.

A printed circuit board (not shown) is screwed to the outer surface of a bottom wall of the case 12. This circuit board controls the respective operations of the spindle motor 18, VCM 24, and magnetic heads through the board unit 21.

The magnetic disk 16 has magnetic recording layers on its upper and lower surfaces, individually. The disk 16 is fitted on the outer periphery of a hub (not shown) of the spindle motor 18 and fixed on the hub by a clamp spring 17. As the motor 18 is driven, the disk 16 is rotated at a given speed of, e.g., 4,200 rpm, in the direction of arrow B.

The carriage assembly 22 comprises a bearing portion 26 fixed on the bottom wall of the case 12 and arms 32 that extend from the bearing portion. These arms 32 are situated parallel to the surface of the magnetic disk 16 and spaced from one another. They extend in the same direction from the bearing portion 26. The carriage assembly 22 is provided with suspensions 38 that are formed of an elastically deformable elongate plate spring each. The suspensions 38, which are formed of a plate spring each, have their respective proximal ends fixed to the respective distal ends of the arms 32 by spot welding or adhesive bonding and extend from the arms. Each suspension 38 may be formed integrally with its corresponding arm 32. The arms 32 and the suspensions 38 constitute a head suspension. The head suspension and the magnetic heads constitute a head suspension assembly.

As shown in FIG. 2, each magnetic head 40 has a slider 42 substantially in the form of a rectangular parallelepiped and a head portion 44 for recording and reproduction on the slider. It is fixed to a gimbals spring 41 that is provided on the distal end portion of the suspension 38. A head load L that is directed toward the surface of the magnetic disk 16 is applied to each magnetic head 40 by the elasticity of the suspension 38.

As shown in FIG. 1, the carriage assembly 22 has a support frame 45 that extends from the bearing portion 26 in a direction opposite from the arms 32. This support frame supports a voice coil 47 that constitutes a part of the VCM 24. The support frame 45 is molded integrally from synthetic resin on the outer periphery of the coil 47. The voice coil 47 is situated between a pair of yokes 49 that are fixed on the case 12. The coil 47, along with the yokes and a magnet (not shown) fixed to one of the yokes, constitutes the VCM 24. If the voice coil 47 is energized, the carriage assembly 22 rocks around the bearing portion 26, and the magnetic head 40 is moved to and positioned on a desired track of the magnetic disk 16.

The ramp load mechanism 25 comprises a ramp 51 and a tab 53. The ramp 51 is provided on the bottom wall of the case 12 and located outside the magnetic disk 16. The tab 53 extends from the distal end of each suspension 38. As the carriage assembly 22 rocks to a retreated position outside the magnetic disk 16, each tab 53 engages a ramp surface formed on the ramp 51. Thereafter, the tab 53 is pulled up by the inclination of the ramp surface, whereby the magnetic head 40 is unloaded.

Figure 3:
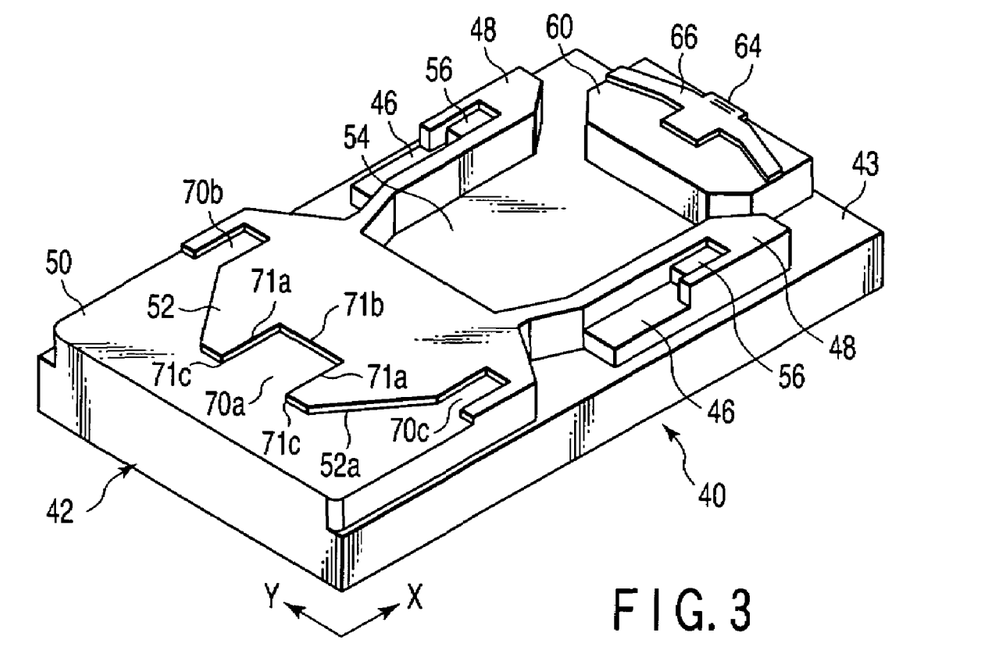
FIG. 3 is a perspective view showing the side of a disk-facing surface of a slider of the magnetic head.

The following is a detailed description of the construction of the magnetic head 40. FIG. 3 is a perspective view showing the slider of the magnetic head, FIG. 4 is a plan view of the slider, and FIG. 5 is a side view of the slider.

Figure 4:
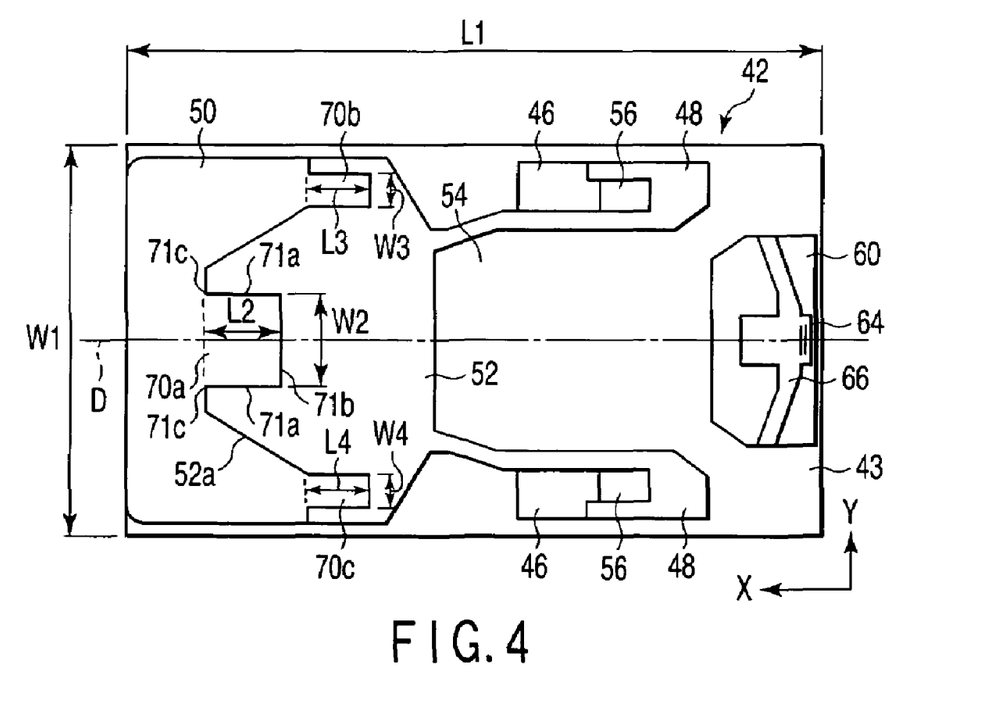
FIG. 4 is a plan view showing the disk-facing surface side of the slider.
Figure 5:
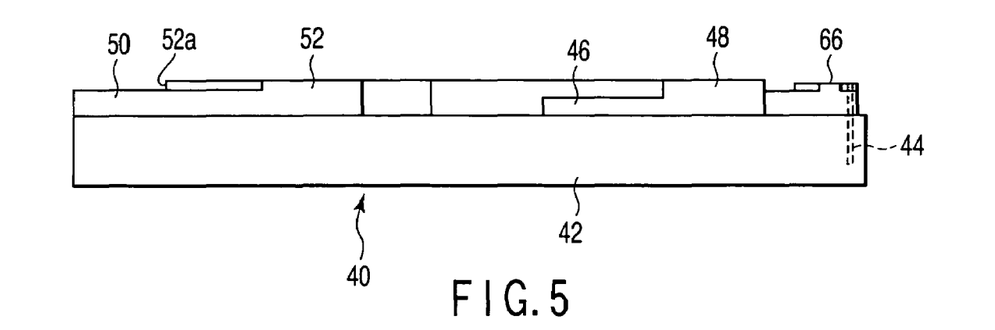
FIG. 5 is a side view showing the slider.

As shown in FIGS. 3 to 5, the magnetic head 40 has the slider 42 substantially in the shape of a rectangular parallelepiped. The slider has a rectangular disk-facing surface or air-bearing surface (ABS surface) 43 that faces a surface of the magnetic disk 16. The longitudinal direction of the disk-facing surface 43 will hereinafter be referred to as a first direction X, and the transverse direction perpendicular to it as a second direction Y. Further, the surface 43 has a central axis D that extends in the first direction X.

The magnetic head 40 is constructed as a flying head. The slider 42 is flown by an air current C that is produced between the disk surface and the disk-facing surface 43 as the magnetic disk 16 rotates. While the HDD is running, the disk-facing surface 43 of the slider 42 never fails to face the disk surface with a gap between them. The direction of the air current C is coincident with the rotation direction B of the magnetic disk 16. The slider 42 is located with respect to the surface of the magnetic disk 16 so that the first direction X of the disk-facing surface 43 is substantially coincident with the direction of the air current C.

A substantially rectangular leading step portion 50 that faces the magnetic disk surface protrudes from the disk-facing surface 43. It is formed covering about ⅔ of an upstream area of the disk-facing surface 43 with respect to the direction of the air current C. A pair of side step portions 46 protrude from the disk-facing surface 43. They extend along the long sides of the disk-facing surface 43 and face each other with a space between them. The side step portions 46 extend from the leading step portion 50 to the downstream end of the slider 42. The step portions 50 and 46 are formed substantially in the shape of a U as a whole, closed on the upstream side and open toward the downstream side.

In order to maintain the pitch angle of the magnetic head 40, a leading pad 52 that supports the slider 42 by an air film protrudes from the leading step portion 50. It continuously extends covering the entire transverse area of the leading pad 52 along the second direction Y and is formed in a position deviated on the downstream side from an inlet end of the slider 42. The leading pad 52 is situated on the inlet side of the slider 42 with respect to the air current C. A side pad 48 is formed on each side step portion 46 and connected to the leading pad 52. The leading pad 52 and the side pads 48 are formed substantially flush with one another and face the magnetic disk surface.

As shown in FIGS. 3 and 4, the leading pad 52 is formed with a plurality of or, for example, three recesses 70a, 70b and 70c for generating positive pressure. The recesses 70a, 70b and 70c open toward the magnetic disk surface and in a rising part of the leading pad 52 on the inlet side of the air current C, that is, an inlet end edge 52a. On the inlet end side of the leading pad 52, the inlet end edge 52a defines an end edge that extends from one end of the leading pad to the other in its transverse direction.

The three recesses 70a, 70b and 70c are arranged symmetrically with respect to the central axis D of the disk-facing surface 43. The recess 70a constitutes a center recess on the central axis D, while the recesses 70b and 70c individually constitute side recesses, which are arranged on the transversely opposite end portions of the leading pad 52 on either side of the central axis D. The recesses 70b and 70c are situated flush with each other with respect to the first direction X and are staggered toward the outlet end side with respect to the recess 70a.

In the present embodiment, each of the recesses 70a, 70b and 70c has a rectangular shape. The recess 70a in the center is defined by a pair of side edges 71a and a bottom edge 71b. The side edges 71a individually extend substantially parallel to the first direction X from the inlet end edge 52a of the leading pad 52. The bottom edge 71b extends substantially parallel to the second direction Y and connects the respective extended ends of the side edges. Thus, the recess 70a has two open end edges 71c that connect with the inlet end edge 52a. The recess 70a serves to generate positive pressure when the air current C runs against the side edges 71a and the bottom edge 71b.

Likewise, each of the recesses 70b and 70c is defined by a pair of side edges and a bottom edge. The side edges individually extend substantially parallel to the first direction X from the inlet end edge 52a of the leading pad 52. The bottom edge extends substantially parallel to the second direction Y and connects the respective extended ends of the side edges. Each of the recesses 70b and 70c has two open end edges that connect with the inlet end edge 52a.

Each of respective lengths L2, L3 and L4 of the recesses 70a, 70b and 70c in the first direction X is about 5% or more of a length L1 of the disk-facing surface 43 in the first direction X. The respective lengths L3 and L4 of the recesses 70b and 70c are set to be equal to each other, and the length L2 of the recess 70a to be a little greater than the lengths L3 and L4.

Each of respective widths W2, W3 and W4 of the recesses 70a, 70b and 70c along the second direction Y is about 5% or more of a width W1 of the disk-facing surface 43 along the second direction Y. The respective widths W3 and W4 of the recesses 70b and 70c are set to be equal to each other, and the width W2 of the recess 70a to be greater than the widths W3 and W4, e.g., about 2.5 times greater.

A recess 56 is formed in each side pad 48. The recess 56 opens to the magnetic disk surface and the inlet end of the disk-facing surface 43. It has a rectangular shape and is defined by a pair of side edges and a bottom edge. The side edges extend substantially parallel to the first direction X. The bottom edge extends substantially parallel to the second direction Y and connects the respective extended ends of the side edges.

As shown in FIGS. 3 to 5, a negative-pressure cavity 54 is formed substantially in the central part of the disk-facing surface 43. It is a recess defined by the pair of side step portions 46 and the leading step portion 50. The negative-pressure cavity 54 is formed on the downstream side of the leading step portion 50 with respect to the direction of the air current C and opens toward the downstream side. The cavity 54 is configured to generate negative pressure in the central part of the disk-facing surface 43 at every yaw angle that can be realized in the HDD.

The slider 42 has a substantially rectangular trailing step portion 60 that protrudes on that end portion of the disk-facing surface 43 on the downstream side with respect to the direction of the air current C. It is situated on the downstream side of the negative-pressure cavity 54 and substantially in the center of the disk-facing surface 43 with respect to its transverse direction. A trailing pad 66 protrudes from the trailing step portion 60 and faces the magnetic disk surface.

The head portion 44 of the magnetic head 40 has a recording element and a reproducing element for recording and reproducing information on the magnetic disk 16. The recording and reproducing elements are embedded in the downstream end portion of the slider 42 with respect to the direction of the air current C. These elements have a read/write gap 64 that is formed in the trailing pad 66.

As shown in FIG. 2, the magnetic head 40 constructed in this manner flies in a tilted posture such that the read/write gap 64 of the head portion 44 is situated closest to the magnetic disk surface.

According to the HDD and the head suspension assembly constructed in this manner, the magnetic head 40 is flown by the air current C that is produced between the disk surface and the disk-facing surface 43 as the magnetic disk 16 rotates. While the HDD is running, the disk-facing surface 43 of the slider 42 never fails to face the disk surface with a gap between them. According to the magnetic head 40 constructed in the aforesaid manner, the negative-pressure cavity 54 in the central part of the disk-facing surface 43 can generate negative pressure with stability. The recesses 70a, 70b and 70c in the leading pad 52 can generate positive pressure, thereby restraining the slider 42 from rolling. Even if the yaw angle of the slider compared with the magnetic disk varies, therefore, variation of the flying roll angle of the slider can be restrained to improve stability and reliability.

Figure 6A:
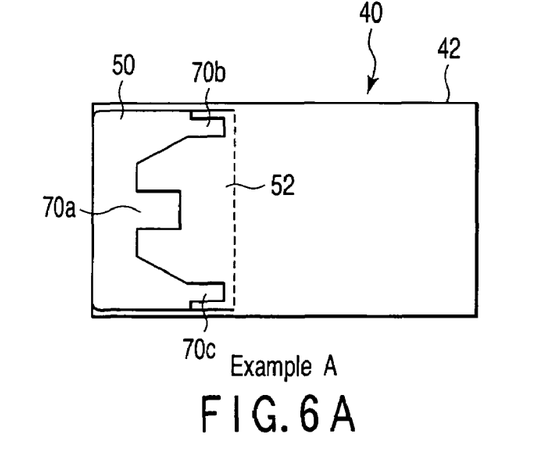
FIGS. 6A, 6B and 6C are plan views schematically showing sliders of Examples A and B and a slider of a comparative example, respectively.
Figure 6B:
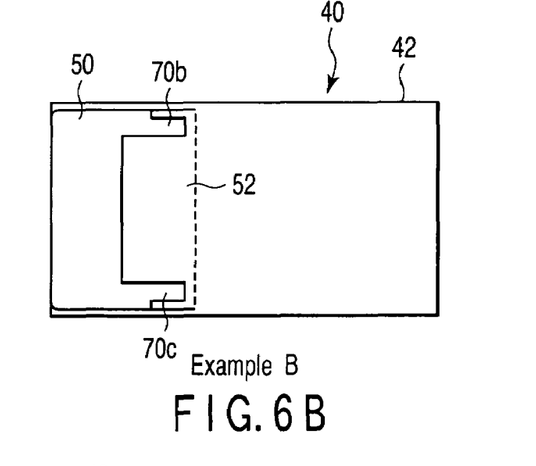
Figure 6C:
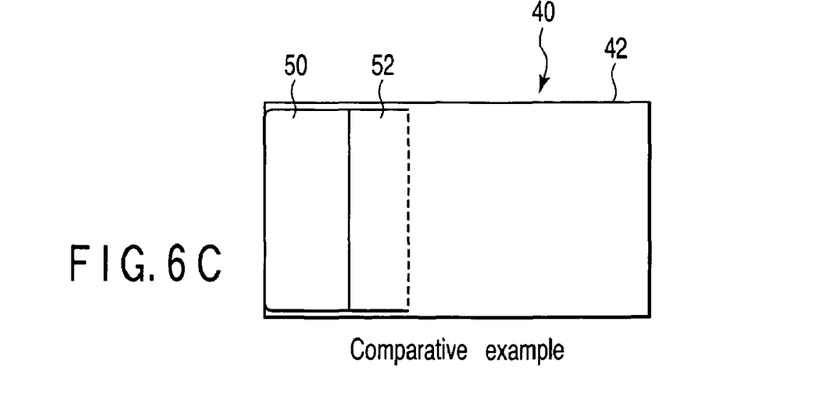

The variation of the flying roll angle was simulated for three sliders (Examples A and B and a comparative example), which are similar to the slider according to the present embodiment. In Example A, the leading pad 52 is provided with the recesses 70a, 70b and 70c, as shown in FIG. 6A. In Example B, the leading pad 52 is provided with only the two recesses 70b and 70c, as shown in FIG. 6B. In the comparative example, the leading pad is provided with no recesses, as shown in FIG. 6C. These three sliders share the area of their leading pads in common and are different only in the presence of recesses.

Figure 7:
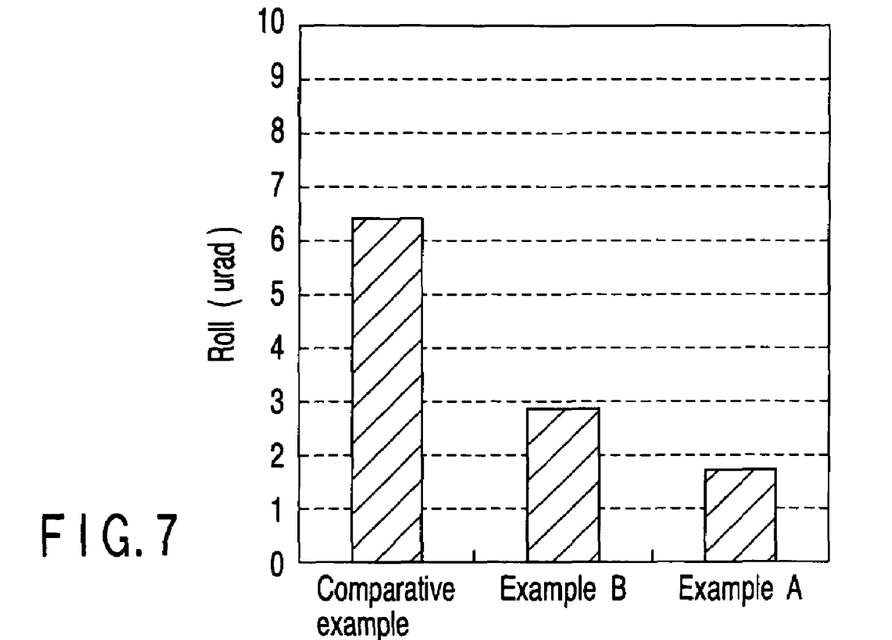
FIG. 7 is a diagram showing averages of absolute values of flying roll angles of the sliders of the embodiment and the comparative example, in various peripheral positions on a magnetic disk.

The respective flying roll angles of the sliders of Examples A and B and the comparative example were simulated covering the entire region of the magnetic disk from the inner periphery to the outer periphery thereof. As shown in FIG. 7, the result of the simulation is that the sliders of Examples A and B are much lower than the comparative example in the (absolute value) average of flying roll angles in various peripheral positions. The flying roll angle average of the slider of Example A, in particular, is about 70% lower than that of the comparative example.

Figure 8:
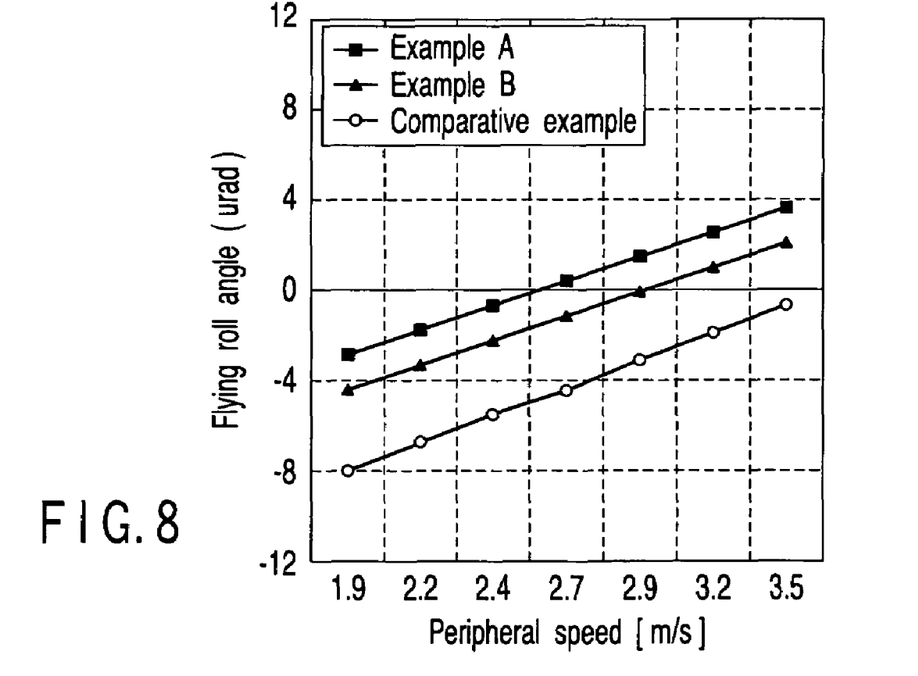
FIG. 8 is a diagram showing variations of the flying roll angles of the sliders of the embodiment and the comparative example, accompanying change of the peripheral speed.

The reduction of flying roll angle variations of the sliders of Examples A and B was analyzed. First, the flying roll angle was simulated for the case where the peripheral speed and the yaw angle changed independently of each other. In any of the sliders of Examples A and B and the comparative example, as shown in FIG. 8, the flying roll angle that depends on the change of the peripheral speed negatively inclines as the peripheral speed lowers from 3.5 m/s at the outer periphery of the disk to 1.9 m/s at the inner periphery.

Figure 9:
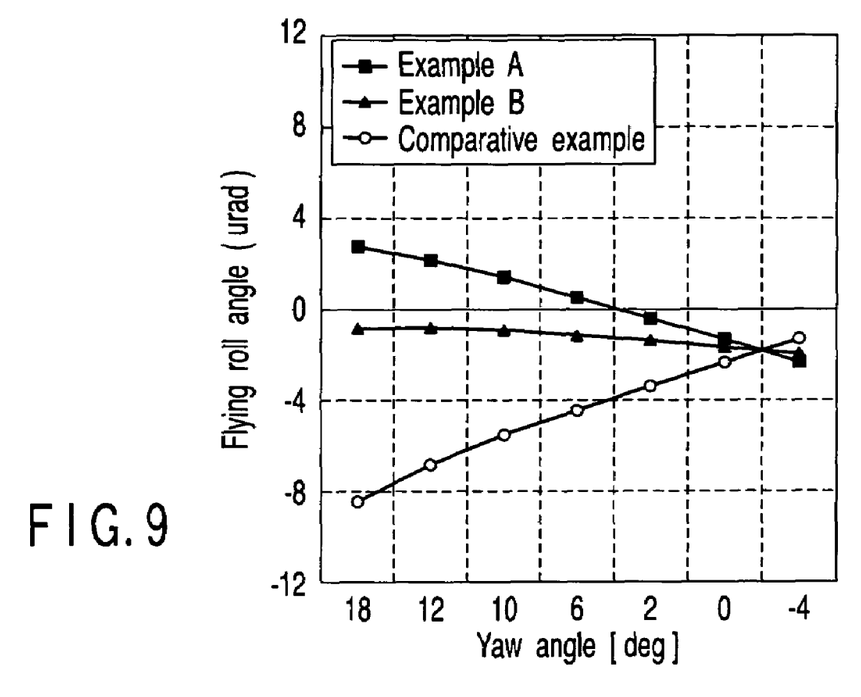
FIG. 9 is a diagram showing variations of the flying roll angles of the sliders of the embodiment and the comparative example, accompanying change of the yaw angle.
Figure 10:
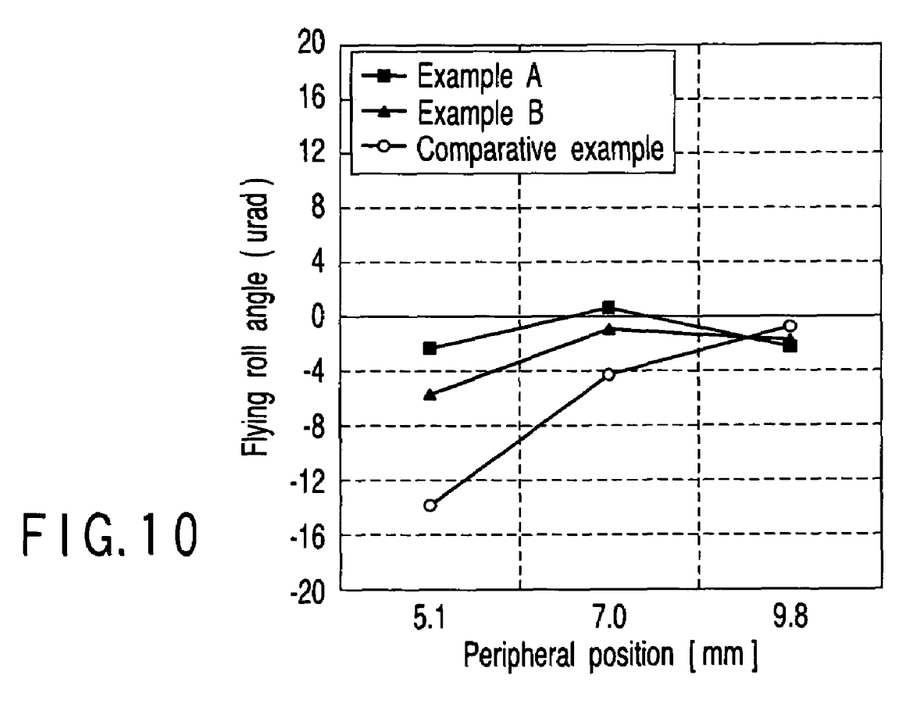
FIG. 10 is a diagram showing the flying roll angles of the sliders of the embodiment and the comparative example, in the peripheral positions on the magnetic disk.

As shown in FIG. 9, however, the roll angle inclines negatively if the yaw angle changes from −4 deg. at the outer periphery of the disk to 18 deg. at the inner periphery in the comparative example. In the Examples A and B, on the other hand, the roll angle inclines positively or in a direction to cancel the negative inclination, in contrast with the case where it varies with the change of the peripheral speed. Thus, in the sliders of Examples A and B, compared with the slider of comparative example, the flying roll angle variation that accompanies the change of the peripheral position (peripheral speed change and yaw angle change) can be reduced, as shown in FIG. 10.

The following is a description of a mechanism for reducing the flying roll angle variation that accompanies the peripheral position change. In restraining the flying roll angle variation of the slider, the longer that side (inlet end edge) of the leading pad against the air current C, the higher the flexibility of adjustment of the flying roll angle is. In the sliders of Examples A and B, therefore, the length and number of sides that receive the air current C are increased by providing the leading pad with the recesses 70a, 70b and 70c, as shown in Table 1.

TABLE 1

| ABS | Slider | Side length (mm) | Ratio to prior art (%) | Number of sides |
|---|---|---|---|---|
| L28 | Example A | 1337 | 203% | 15 |
| L29 | Example B | 1287 | 195% | 9 |
| L30 | Comparative example | 660 | 100% | 1 |

Figure 11A:
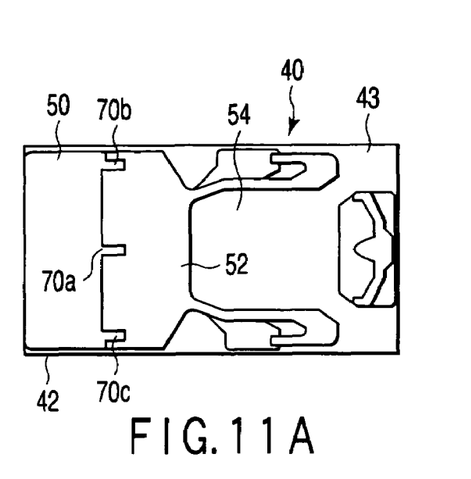
FIGS. 11A, 11B and 11C are plan views schematically showing sliders of three types of the embodiment having recesses of different lengths in their leading pads.
Figure 11B:
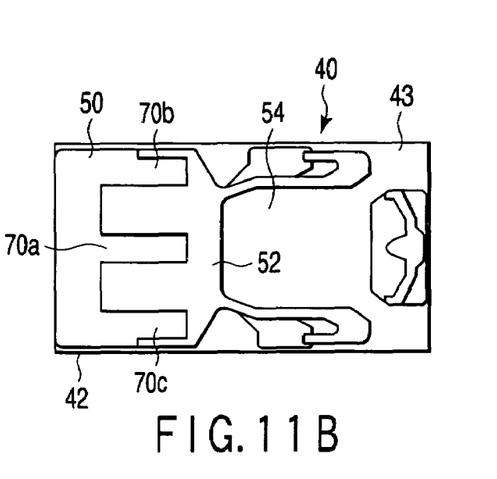
Figures 11C, 12:
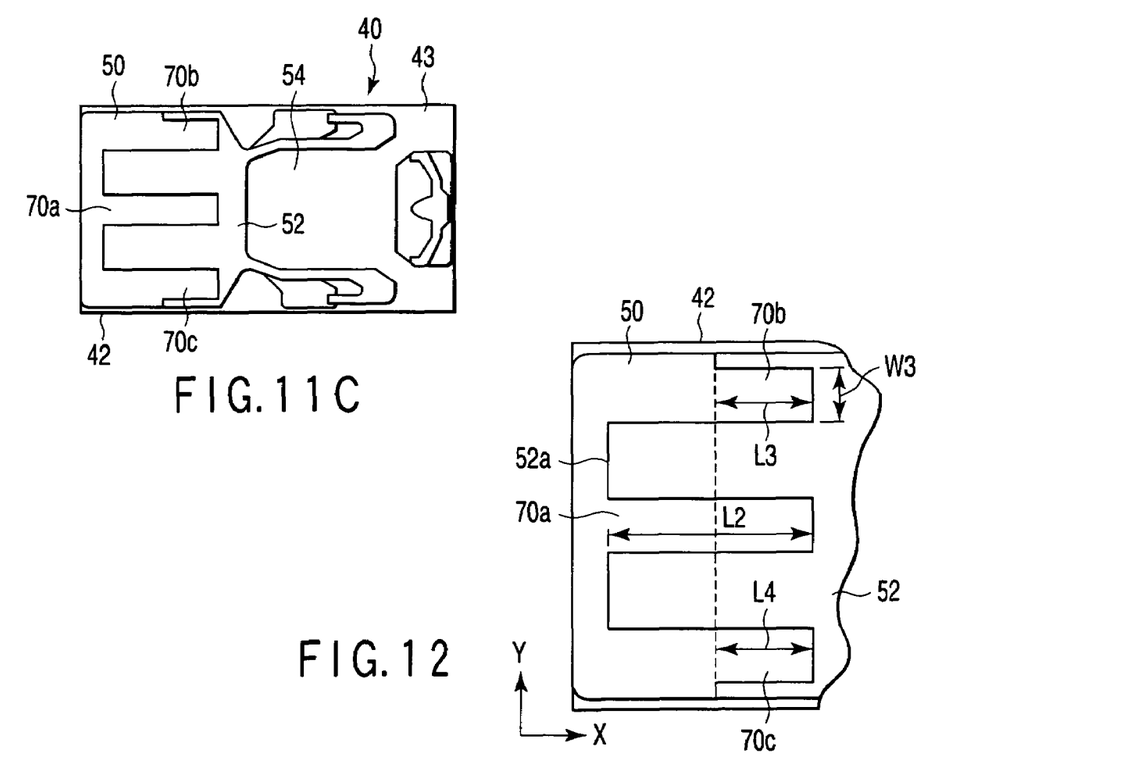
FIG. 12 is an enlarged plan view showing recesses in a leading pad.

The greater the depth of the recesses in the leading pad or the lengths L, moreover, the longer the side (inlet end edge) of the leading pad is, and the more effectively the flying roll angle variation can be restrained. Sliders of three types that share the area of their leading pads in common and have recesses 70a, 70b and 70c of different lengths L were prepared, as shown in FIGS. 11A, 11B and 11C. The flying roll angle variations of these sliders in various peripheral positions were simulated together with that of the comparative example. In the three sliders shown in FIGS. 11A, 11B and 11C, the lengths L of the recesses individually account for 5%, 13% and 15% of the length L of the disk-facing surface (slider). In the first direction X of the disk-facing surface, as shown in FIG. 12, the length L of each recess is the shortest length from the inlet end edge 52a of the leading pad 52 to the bottom edge of the recess, and the width W of each recess is a width along a direction parallel to the second direction Y of the disk-facing surface.

Figure 13:
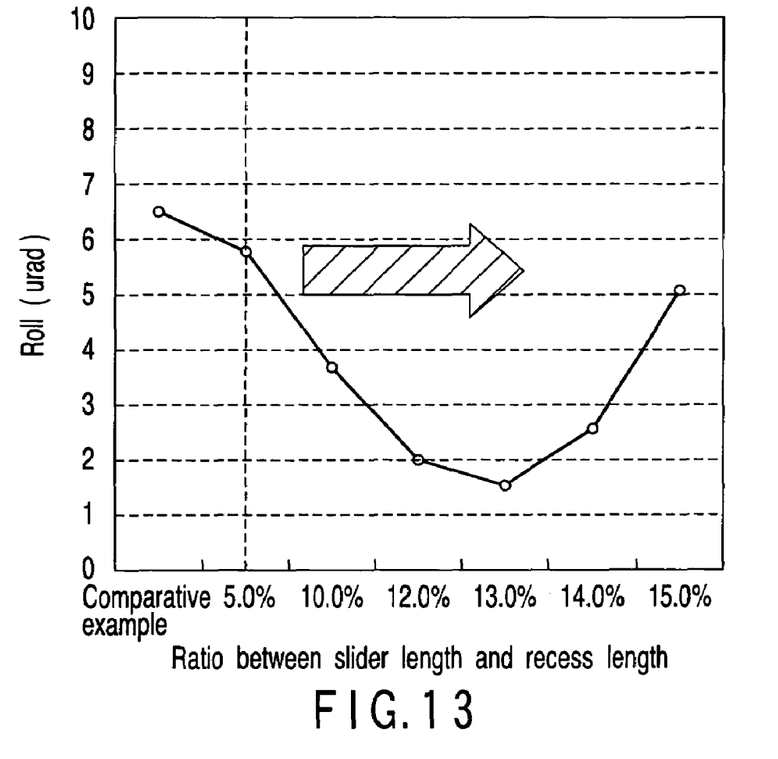
FIG. 13 is a diagram showing the relationship between the ratio between the lengths of the recesses in the leading pad and the absolute value averages of the flying roll angles in various peripheral positions on the magnetic disk.

As the ratio of the length L of each recess to the length L1 of the disk-facing surface increases, as seen from FIG. 13, the average of the absolute values of the flying roll angles of the slider in the individual peripheral positions is reduced. It can be seen, in particular, that the average is greatly lowered if the length ratio exceeds 5%. If the ratio exceeds 13%, in contrast with this, the average of the absolute values of the flying roll angles tends to increase. Therefore, the length of each recess of the leading pad should preferably be 5% or more of that of the disk-facing surface, and more preferably 5% to 13%, depending on the size of the leading pad.

Pressure distributions of the sliders of Example A and the comparative example were examined. In the slider of Example A, the distribution of positive pressure generated by the leading pad portion substantially has the shape of a triangle of which slopes are directed toward the inner and outer peripheries of the disk. Thus, the leading pad can receive the yawed air current with a good balance, thereby restraining the flying roll angle variation.

Figure 14A:
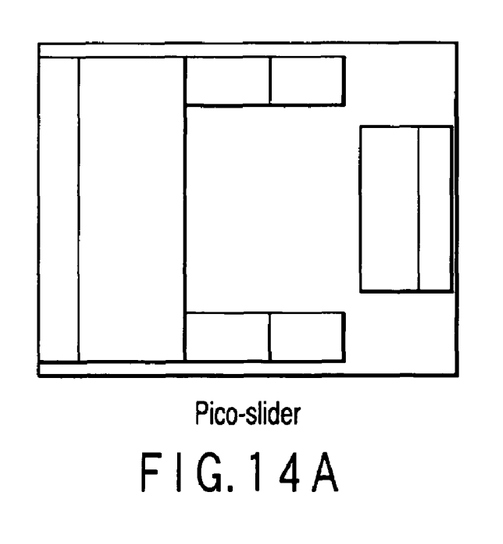
FIGS. 14A and 14B are plan views schematically showing a pico-slider and a pemto-slider in comparison with each other.
Figure 14B:
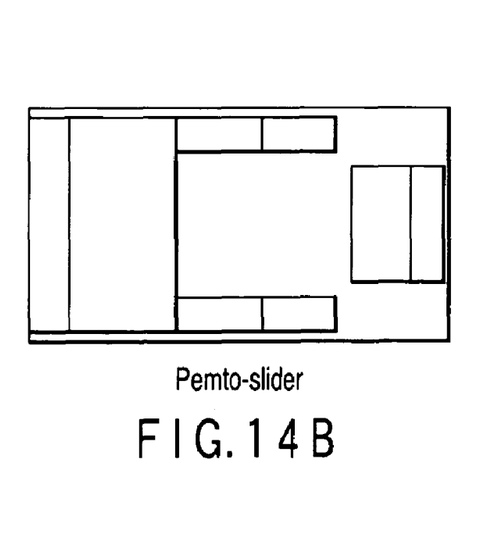

The effect of reducing flying roll, described above, is valid for smaller sliders. FIGS. 14A and 14B show a pico-slider and a pemto-slider for comparison in size. Table 2 shows the respective lengths and widths of the pico-slider, the pemto-slider, and a femto-slider.

TABLE 2

| Slider name | Length (mm) | Width (mm) |
|---|---|---|
| Pico- | 1.250 | 1.000 |
| Pemto- | 1.250 | 0.700 |
| Femto- | 0.850 | 0.700 |

Figure 15:
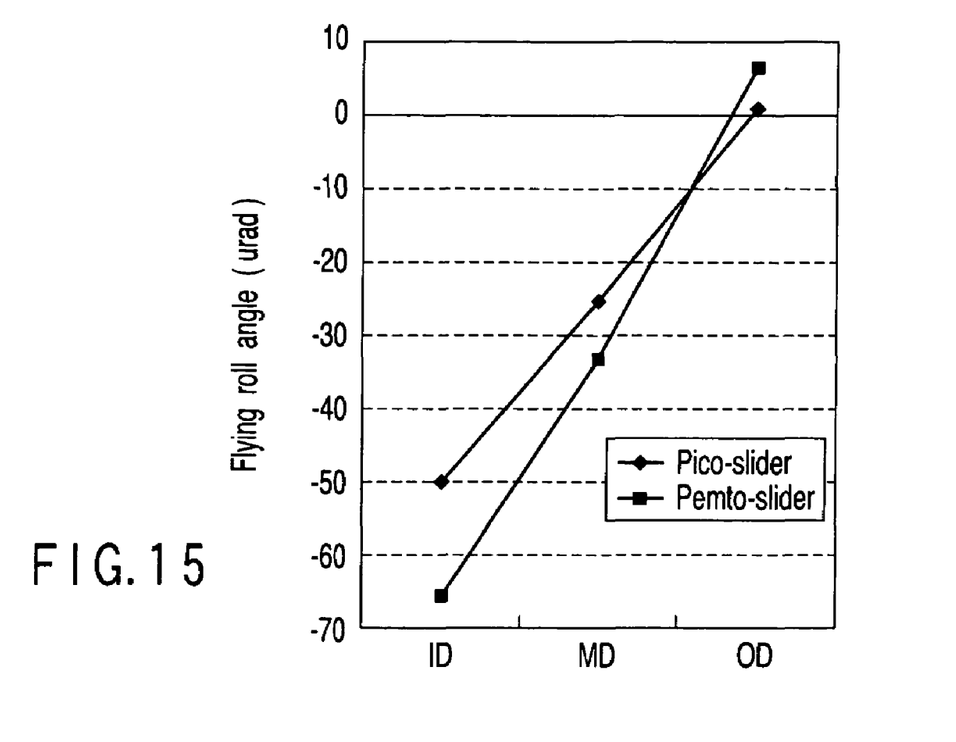
FIG. 15 is a diagram comparatively showing respective flying roll angles of the pico- and pemto-sliders in various positions on the magnetic disk.
Figure 16:
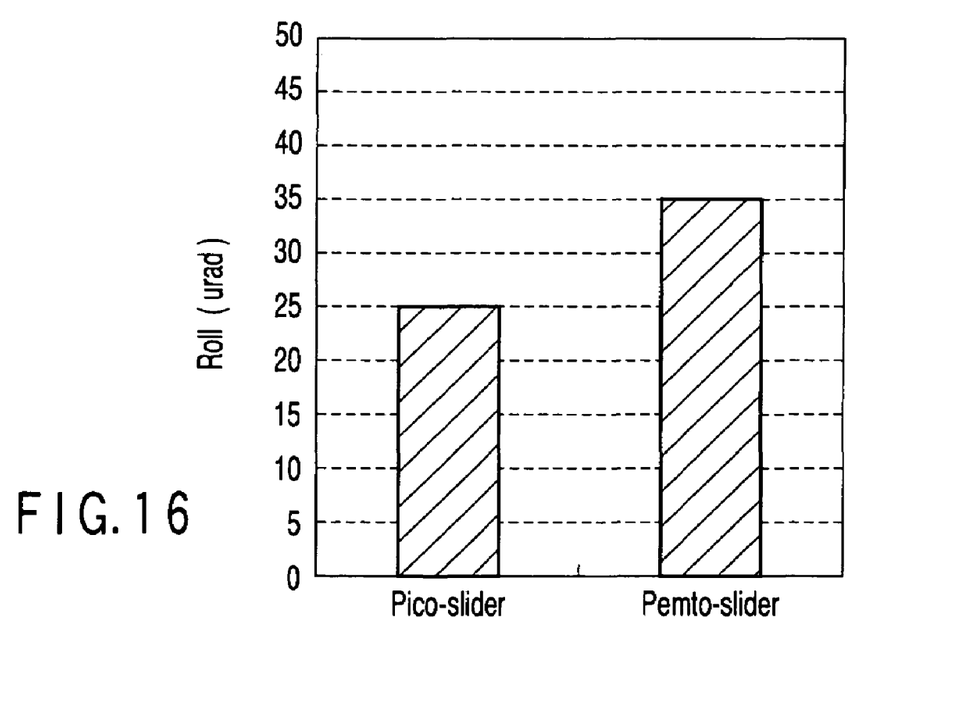
FIG. 16 is a diagram showing absolute value averages of the flying roll angles of the pico- and pemto-sliders in various positions on the magnetic disk.

FIG. 15 shows flying roll angles of the pico- and pemto-sliders at the inner periphery, intermediate region, and outer periphery of the disk. FIG. 16 shows averages of absolute values of the flying roll angles of the pico- and pemto-sliders. As seen from these drawings, the pemto-slider, which is narrower than the pico-slider, is subject to greater flying roll angle variations. Thus, the configuration of the slider of the present embodiment, compared with the pemto- and femto-sliders of 0.7-mm width that is 30% narrower than the currently prevailing pico-sliders, is particularly effective in reducing the flying roll angle variations. The present embodiment may be applied to pemto- and femto-sliders with lengths of 1.250 mm or less and widths of 0.7 mm or less, for example.

According to the present embodiment, as described above, a plurality of recesses are provided on the inlet end side of the leading pad of the slider, so that no negative-pressure area can be lost. Therefore, the flying roll angle variation can be reduced if the slider is moved from the inner periphery of a rotating disk to the outer periphery. Thus, the resulting head, head suspension assembly, and HDD can enjoy improved stability and reliability.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Figure 17:
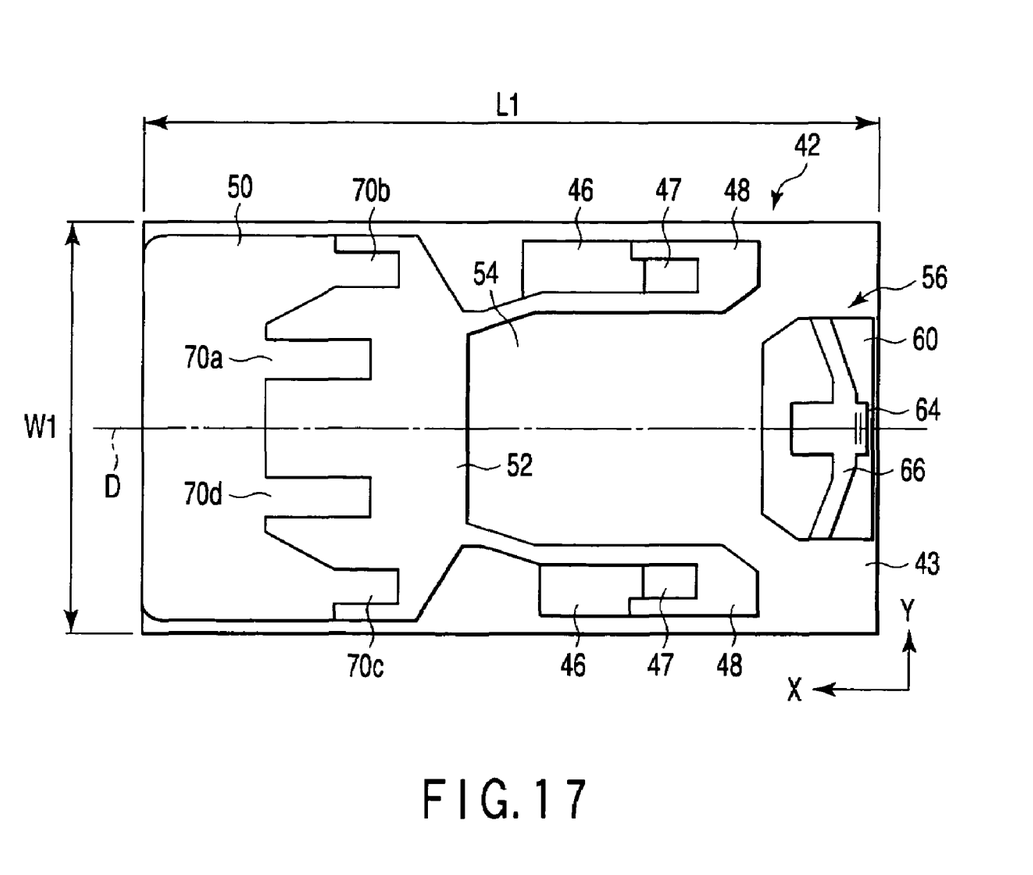
FIG. 17 is a plan view showing the side of a disk-facing surface of a slider of an HDD according to another embodiment of the invention.

In the embodiment described above, the recesses of the leading pad are provided on and on either side of the central axis of the disk-facing surface. As in another embodiment shown in FIG. 17, however, the recess on the central axis may be omitted. In this case, a plurality of or, for example, two recesses 70a and 70b may be arranged on one side of the central axis, and another two recesses 70c and 70d on the other side. In the embodiment shown in FIG. 17, other configurations are the same as those of the foregoing embodiment. Therefore, like reference numerals are used to designate like portions of the two embodiments, and a detailed description of those portions is omitted. After all, the second embodiment can provide the same functions and effects of the first embodiment.

Further, the recesses are not limited to rectangular shapes, but may alternatively be of various other shapes, such as triangular, polygonal, circular, and elliptic shapes. Preferably, in this case, the open end of each recess should have two open end edge that connects with the inlet end edge of the leading pad. Furthermore, this invention is not limited to the pico-, pemto-, and femto-sliders, but is also applicable to any other sliders of larger sizes.

What is claimed is:

1. A head comprising:
   a slider which has a facing surface opposed to a surface of a rotatable recording medium and is flown by an air current produced between the recording medium surface and the facing surface as the recording medium rotates; and
   a head portion which is provided on the slider and records and reproduces information to and from the recording medium,
   the facing surface of the slider having a longitudinal direction extending in the direction of the air current, a transverse direction perpendicular to the longitudinal direction, and a central axis extending in the longitudinal direction,
   the slider having a negative-pressure cavity which is formed in the facing surface and generates a negative pressure, a leading step portion which is raised from a bottom surface of the negative-pressure cavity and is situated on an upstream side of the air current with respect to the negative-pressure cavity, and a leading pad which is provided on the leading step portion and faces the recording medium,
   the leading pad having an inlet end edge which is situated on the upstream side of the air current and extends throughout a length of the leading step portion in the transverse direction and a plurality of recesses which individually open in the inlet end edge and extend in the longitudinal direction from the inlet end edge,
   the recesses including a center recess on the central axis and side recesses, at least one on each side of the central axis, and the side recesses being situated flush with each other with respect to the longitudinal direction and being staggered toward the downstream side of the air current with respect to the center recess.

2. A head according to claim 1, wherein the recesses are arranged symmetrically with respect to the central axis.

3. A head according to claim 1, wherein a length of each of the recesses in the longitudinal direction accounts for 5% or more of a length of the facing face in the longitudinal direction.

4. A head according to claim 1, wherein a length of each of the recesses in the transverse direction accounts for 5% or more of a length of the facing face in the transverse direction.

5. A head according to claim 1, wherein each of the recesses is in the form of a rectangle defined by a pair of side edges which extend in the longitudinal direction from the inlet end edge of the leading pad and a bottom edge extending in the transverse direction.

6. A head according to claim 1, wherein the slider has a length of 1.25 mm or less in the longitudinal direction and a length of 0.7 nm or less in the transverse direction.

7. A head suspension assembly used in a disk device comprising a disk-shaped recording medium and a drive section which supports and rotates the recording medium, the head suspension assembly comprising:
   a head having a slider which has a facing surface opposed to a surface of the recording medium and is flown by an air current produced between the recording medium surface and the facing surface as the recording medium rotates and a head portion which is provided on the slider and records and reproduces information to and from the recording medium; and
   a head suspension which supports the head for movement with respect to the recording medium and applies a head load directed toward the recording medium surface to the head,
   the facing surface of the slider having a longitudinal direction extending in the direction of the air current a transverse direction perpendicular to the longitudinal direction, and a central axis extending in the longitudinal direction, the slider having a negative-pressure cavity which is formed in the facing surface and generates a negative pressure, a leading step portion which is raised from a bottom surface of the negative-pressure cavity and is situated on an upstream side of the air current with respect to the negative-pressure cavity, and a leading pad which is provided on the leading step portion and faces the recording medium,
   the leading pad having an inlet end edge which is situated on the upstream side of the air current and extends throughout a length of the leading step portion in the transverse direction and a plurality of recesses which individually open in the inlet end edge and extend in the longitudinal direction from the inlet end edge,
   the recesses including a center recess on the central axis and side recesses, at least one on each side of the central axis, and the side recesses being situated flush with each other with respect to the longitudinal direction and being staggered toward the downstream side of the air current with respect to the center recess.

8. A disk device comprising:
   a disk-shaped recording medium;
   a drive section which supports and rotates the recording medium;
   a head having a slider which has a facing surface opposed to a surface of the recording medium and is flown by an air current produced between the recording medium surface and the facing surface as the recording medium rotates and a head portion which is provided on the slider and records and reproduces information to and from the recording medium; and
   a head suspension which supports the head for movement with respect to the recording medium and applies a head load directed toward the recording medium surface to the head,
   the facing surface of the slider having a longitudinal direction extending in the direction of the air current a transverse direction perpendicular to the longitudinal direction, and a central axis extending in the longitudinal direction, the slider having a negative-pressure cavity which is formed in the facing surface and generates a negative pressure, a leading step portion which is raised from a bottom surface of the negative-pressure cavity and is situated on an upstream side of the air current with respect to the negative-pressure cavity, and a leading pad which is provided on the leading step portion and faces the recording medium, the leading pad having an inlet end edge which is situated on the upstream side of the air current and extends throughout a length of the leading step portion in the transverse direction and a plurality of recesses which individually open in the inlet end edge and extend in the longitudinal direction from the inlet end edge, the recesses including a center recess on the central axis and side recesses, at least one on each side of the central axis, and the side recesses being situated flush with each other with respect to the longitudinal direction and being staggered toward the downstream side of the air current with respect to the center recess.

9. A head comprising:

a slider which has a facing surface opposed to a surface of a rotatable recording medium and is flown by an air current produced between the recording medium surface and the facing surface as the recording medium rotates; and a head portion which is provided on the slider and records and reproduces information to and from the recording medium, the facing surface of the slider having a longitudinal direction extending in the direction of the air current a transverse direction perpendicular to the longitudinal direction, and a central axis extending in the longitudinal direction, the slider having a negative-pressure cavity which is formed in the facing surface and generates a negative pressure, a leading step portion which is raised from a bottom surface of the negative-pressure cavity and is situated on an upstream side of the air current with respect to the negative-pressure cavity, and a leading pad which is provided on the leading step portion and faces the recording medium, the leading pad having an inlet end edge which is situated on the upstream side of the air current and extends throughout a length of the leading step portion in the transverse direction and a plurality of recesses which individually open in the inlet end edge and extend in the longitudinal direction from the inlet end edge, the recesses including a center recess on the central axis and side recesses, at least one on each side of the central axis, and a width of the center recess in the transverse direction being greater than a width of each side recess in the transverse direction.

10. A head comprising:

a slider which has a facing surface opposed to a surface of a rotatable recording medium and is flown by an air current produced between the recording medium surface and the facing surface as the recording medium rotates; and a head portion which is provided on the slider and records and reproduces information to and from the recording medium, the facing surface of the slider having a longitudinal direction extending in the direction of the air current a transverse direction perpendicular to the longitudinal direction, and a central axis extending in the longitudinal direction, the slider having a negative-pressure cavity which is formed in the facing surface and generates a negative pressure, a leading step portion which is raised from a bottom surface of the negative-pressure cavity and is situated on an upstream side of the air current with respect to the negative-pressure cavity, and a leading pad which is provided on the leading step portion and faces the recording medium, the leading pad having an inlet end edge which is situated on the upstream side of the air current and extends throughout a length of the leading step portion in the transverse direction and a plurality of recesses which individually open in the inlet end edge and extend in the longitudinal direction from the inlet end edge, the recesses including center recesses on the central axis, at least one on each side of the central axis, and side recesses, at least one on each side of the central axis, and the side recesses being situated flush with each other with respect to the longitudinal direction and being staggered toward the downstream side of the air current with respect to the center recess.

11. A head comprising:

a slider which has a facing surface opposed to a surface of a rotatable recording medium and is flown by an air current produced between the recording medium surface and the facing surface as the recording medium rotates; and a head portion which is provided on the slider and records and reproduces information to and from the recording medium, the facing surface of the slider having a longitudinal direction extending in the direction of the air current a transverse direction perpendicular to the longitudinal direction, and a central axis extending in the longitudinal direction, the slider having a negative-pressure cavity which is formed in the facing surface and generates a negative pressure, a leading step portion which is raised from a bottom surface of the negative-pressure cavity and is situated on an upstream side of the air current with respect to the negative-pressure cavity, and a leading pad which is provided on the leading step portion and faces the recording medium, the leading pad having an inlet end edge which is situated on the upstream side of the air current and extends throughout a length of the leading step portion in the transverse direction and a plurality of recesses which individually open in the inlet end edge and extend in the longitudinal direction from the inlet end edge, the recesses including center recesses on the central axis, at least one on each side of the central axis, and side recesses, at least one on each side of the central axis, and a width of each center recess in the transverse direction being greater than a width of each side recess in the transverse direction.

* * * * *